United States Patent
Hoory et al.

(10) Patent No.: US 10,226,702 B2
(45) Date of Patent: Mar. 12, 2019

(54) VEHICLE ENTERTAINMENT SYSTEM

(71) Applicant: International Business Machines Corporation, Armonk, NY (US)

(72) Inventors: Ron Hoory, Ramat Yishay (IL); Mattias Marder, Haifa (IL); Slava Shechtman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 14/720,849

(22) Filed: May 25, 2015

(65) Prior Publication Data

US 2016/0346695 A1   Dec. 1, 2016

(51) Int. Cl.
| | | |
|---|---|---|
| *A63F 13/00* | (2014.01) | |
| *A63F 9/24* | (2006.01) | |
| *A63F 13/65* | (2014.01) | |
| *G06K 9/00* | (2006.01) | |
| *A63F 13/80* | (2014.01) | |
| *A63F 13/46* | (2014.01) | |
| *A63F 13/54* | (2014.01) | |
| *A63F 13/52* | (2014.01) | |
| *A63F 13/215* | (2014.01) | |
| *A63F 13/213* | (2014.01) | |

(52) U.S. Cl.
CPC .......... *A63F 13/65* (2014.09); *A63F 13/213* (2014.09); *A63F 13/215* (2014.09); *A63F 13/46* (2014.09); *A63F 13/52* (2014.09); *A63F 13/54* (2014.09); *A63F 13/80* (2014.09); *G06K 9/00832* (2013.01)

(58) Field of Classification Search
CPC ...... A63F 13/213; A63F 13/215; A63F 13/46; A63F 13/52; A63F 13/54; A63F 13/65; A63F 13/80; G06K 9/00791; G06K 9/00798; G06K 9/00805; G06K 9/00818; G06K 9/00825

See application file for complete search history.

(56) References Cited

U.S. PATENT DOCUMENTS

| | | | | |
|---|---|---|---|---|
| 5,694,116 A * | 12/1997 | Kojima | ................. | G08B 21/06 180/272 |
| 6,154,123 A * | 11/2000 | Kleinberg | ............. | G08B 21/06 180/169 |
| 6,249,720 B1 * | 6/2001 | Kubota | ............... | B60R 16/0232 340/990 |
| 6,401,033 B1 * | 6/2002 | Paulauskas | ............ | A63F 13/10 340/990 |
| 6,756,903 B2 * | 6/2004 | Omry | .................. | B60K 28/066 340/425.5 |

(Continued)

OTHER PUBLICATIONS

Disclosed Anonymously., "System to limit distracted driving", System to limit distracted driving, Jul. 16, 2010.

*Primary Examiner* — Milap Shah
(74) *Attorney, Agent, or Firm* — G&A Glazberg Applboum

(57) ABSTRACT

A computer-implemented method, computerized apparatus and computer program product. The method comprises capturing one or more images of a scene in which a driver is driving a vehicle; analyzing the images to retrieve an event or detail; conveying to the driver the a question or a challenge related to the event or detail; receiving a response from the driver; analyzing the response; and determining a score related to the driver.

17 Claims, 3 Drawing Sheets

(56) References Cited

U.S. PATENT DOCUMENTS

| | | | | |
|---|---|---|---|---|
| 6,895,238 | B2* | 5/2005 | Newell | A63F 13/12 340/988 |
| 7,982,620 | B2 | 7/2011 | Prokhorov et al. | |
| 8,758,126 | B2* | 6/2014 | Bavitz | A63F 9/24 463/1 |
| 8,758,127 | B2* | 6/2014 | Wang | A63F 9/24 463/1 |
| 8,957,779 | B2* | 2/2015 | Wu | G08B 21/06 340/575 |
| 9,198,575 | B1* | 12/2015 | Blacutt | A61B 3/113 |
| 9,266,018 | B2* | 2/2016 | Story, Jr. | A63F 9/24 |
| 9,292,471 | B2* | 3/2016 | Fung | B60W 40/09 |
| 9,327,189 | B2* | 5/2016 | Bavitz | A63F 13/00 |
| 2002/0091473 | A1* | 7/2002 | Gardner | G07C 5/0808 701/32.7 |
| 2004/0224740 | A1* | 11/2004 | Ball | A63F 13/10 463/6 |
| 2006/0259206 | A1* | 11/2006 | Smith | A61B 3/113 701/1 |
| 2007/0149284 | A1* | 6/2007 | Plavetich | A63F 13/00 463/37 |
| 2008/0291032 | A1* | 11/2008 | Prokhorov | B60K 28/066 340/576 |
| 2008/0311983 | A1* | 12/2008 | Koempel | A63F 13/10 463/31 |
| 2009/0034798 | A1* | 2/2009 | Mueller-Schneiders | G06K 9/00818 382/104 |
| 2014/0128144 | A1* | 5/2014 | Bavitz | A63F 9/24 463/23 |
| 2014/0236472 | A1* | 8/2014 | Rosario | G01C 21/3602 701/400 |
| 2016/0325740 | A1* | 11/2016 | Onica | B60K 35/00 |

* cited by examiner

VEHICLE ENTERTAINMENT SYSTEM

TECHNICAL FIELD

The present disclosure relates to a vehicle entertainment system in general, and to a dialog-generating vehicle entertainment system in particular.

BACKGROUND

A leading cause of traffic accidents is related to drivers who fall asleep or even just doze for a fraction of a second during driving. When a person is driving for long periods of time, at certain conditions such as hot weather or a boring road, or at certain hours such as after lunch or late night, there is significant chance that the driver's attention will decrease, which can lead to serious consequences.

Many approaches have been suggested to overcome this problem. Some approaches evaluate the driver's physical condition, for example by measuring the driver's head position or slope and generating an alert when the angle between the driver's head and his chest is below a predetermined value. Other approaches may evaluate other body parameters of the driver such as heart rate, or the like. However, such methods may fail to significantly increase security since the driver may become inattentive or fall asleep before a physical expression can be detected.

Other approaches may try and evaluate the driver's driving manner, for example detect sharp lane deviations, or the like.

It is well known that a good solution for keeping the driver awake is for the driver to engage in a conversation with another person, whether with a person present in the car or over the phone. However, this is not always a possibility.

BRIEF SUMMARY

One exemplary embodiment of the disclosed subject matter is a computer-implemented method, computerized apparatus and computer program product. The method comprises capturing one or more images of a scene in which a driver is driving a vehicle; analyzing the images to retrieve an event or detail; conveying to the driver the a question or a challenge related to the event or detail; receiving a response from the driver; analyzing the response; and determining a score related to the driver.

Another exemplary embodiment of the disclosed subject matter is a computerized apparatus having a processor, the processor being adapted to perform the steps of: capturing one or more images of a scene in which a driver is driving a vehicle; analyzing the images to retrieve an event or detail; conveying to the driver the a question or a challenge related to the event or detail; receiving a response from the driver; analyzing the response; and determining a score for the driver.

Yet another exemplary embodiment of the disclosed subject matter is a computer program product comprising a computer readable storage medium retaining program instructions, which program instructions when read by a processor, cause the processor to perform a method comprising: capturing an image of a scene in which a driver is driving a vehicle; analyzing the image to retrieve an event or detail; generating a question or a challenge related to the event or detail; playing an audio comprising the question to the driver; receiving an audio signal from the driver; analyzing the audio signal to retrieve a response; and assigning determining a score to the driver.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
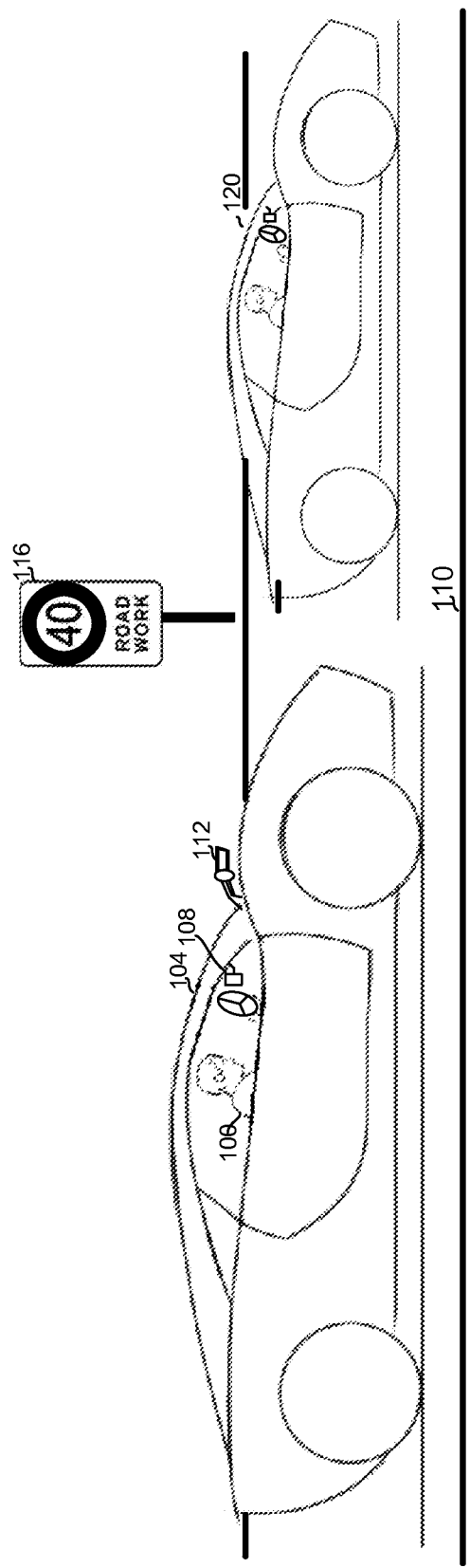
FIG. 1 shows an illustration of a driven car, wherein the driver is engaged in an entertainment program based on the visual scene, in accordance with some exemplary embodiments of the subject matter.

One technical problem dealt with by the disclosed subject matter is to keep a driver of a vehicle such as a car, a truck, a bus or the like awake and alert even in tough road, hours, or driving conditions. In many situations, such as after heavy meals, during noon or late hours, boring road or the like, drivers may be less alert, and may even fall asleep, wherein even an instantaneous eye shutting may lead to horrible results.

One technical solution comprises an entertainment system that engages the driver in mental and verbal activity. The entertainment system may comprise a computing device that generates questions or other triggers for receiving input from the driver. The computing device may be remote or local, such as a smartphone or a dedicated device. The questions or triggers may be based on cues or information received by analyzing a visual presentation of the scene or the environment of the vehicle, as may be captured by a capture device located in or on the vehicle, for example as a part of a smartphone used by the driver. In some embodiments, audio input may also be captured and used. For example, near an airport the airplanes' taking off and landing noise may be captured and analyzed. Thus, the system may create a program such as a quiz, a questionnaire or a dialog with the driver, such that in order to successfully engage in the program and provide correct answers the driver has to be alert and aware of the environment. In some embodiments, the driver may be triggered to perform some action based on the visual cue, such as select music, switch radio channel, or the like. On the other hand, the questions or challenges presented to the driver do not require the driver to deviate his attention to directions other than the road or do things that may reduce his concentration. The questions may be presented by playing audio, reading out the questions, whether by playing pre-recorded texts, by speech-to-text methods or a combination thereof, and responses to the questions or challenges may be received by analyzing the driver's voice as captured by an audio capture device such as a microphone. In some embodiments, the driver may not be required to perform any other action but speaking, such as pressing buttons or otherwise using his hands, so his attention is not deviated from the road and the driving.

The driver's responses may be compared against known or predetermined answers, and the driver may be credited for correct answers. The credit may be in the form of points in a social network, reduction in the insurance premium, or the like.

The questions may relate to and be based on objects in the scene, such as road signs, signs on buildings, vehicles in the vicinity of the driven vehicle, temporary humans or objects in the scene such as pedestrians, or the like. Additionally or alternatively, the questions may relate to the area, the car, the driver himself, general trivia questions, or the like, The questions may be generated by a question generator located within the vehicle or at a remote location, for example on a cloud computer. Analyzing the scene may also be performed on the cloud, within the vehicle, such that only the findings may be sent to the cloud. A combined approach may also be used in which some analysis is performed within the car and some at a remote location.

In some embodiments, questions related to the scene may also involve information received from other systems, devices, humans or other sources, such as Global Positioning System (GPS) with or without a mapping system. For example, questions may be generated which relate to names of places visible from the car or further away, such as "what is the name of the city 20 miles north of where you are?"

In some embodiments, questions related to the scene may be generated from scenes captured by devices mounted on other vehicles. For example, by the time a sign that is clearly captured by the capturing device mounted on the car is analyzed and a question is generated, the driver may not be able to see the sign anymore. Thus, it may be useful to capture and optionally analyze the scene, and use the images or audio information for generating a question that will be presented to the same driver or to another driver passing in the vicinity at a later time, such as a few seconds, minutes, hours, or days later.

In some embodiments, data captured by sensors associated with a multiplicity of vehicles may be used for generating data or questions. In particular, identifying data from a multiplicity of sensors may be used for enhancing the recognition results. For example, retrieving text or data from signs captured by two or more different cameras may improve the recognition rate, identifying details of an object in a scene may be more exact if the object is captured by two independent sensors, or the like. In some embodiments, data may be captured by further vehicles if the recognition certainty associated with the first capture is below a predetermined threshold.

In some embodiments, the system may be adapted to identify a code word that may be used to immediately stop the dialog, for example in an emergency situation, when the driver's phone rings, or whenever the driver wishes.

One technical effect of utilizing the disclosed subject matter is the provisioning of a method and system for engaging a driver in an activity, wherein the activity may be based on analysis of the visual scene of the area the driver is in, and wherein the driver provides his input vocally and is not distracted from driving. Using the system may prevent the driver from falling asleep and endangering himself and others.

Referring now to FIG. 1 showing a computerized environment in which the disclosed subject matter is used, in accordance with some exemplary embodiments of the subject matter.

A driver 100 is driving a car 104 on road 110. In order to keep driver 100 awake and alert, driver 100 is engaged in an activity or quiz presented by an application executed by mobile device 108 optionally installed or temporarily located within car 104, which may be in communication with one or more remote computing platforms such as one or more remote servers (not shown). The driver's responses may be analyzed locally or on a remote platform, in order to determine whether the answer is right or wrong, and the driver's score may also be calculated or stored locally or on a remote platform.

Car 104 may be equipped, internally or externally, with capture device 112 such as a camera, a video camera, or the like, outputting a signal to be received by mobile device 108 or a remote platform. Capture device 112 may be controlled by the application and may start or stop capturing upon commands received from the application. Capturing may be continuous, intermittent, or any combination thereof. It will be appreciated that capture device 112 may be a part of or otherwise embedded within mobile device 108.

Capture device 112 may capture the environment of the car, including for example road sign 116. After analyzing one or more captured images, the application may generate and present to the driver a question or another challenge related to the captured scene, for example, "what is the speed limit in this area", to which the expected answer is "40", "why is the speed limited in this area", to which the expected answer is "road work". Analyzing the image may comprise image analysis for retrieving sign shapes, objects or the like, and/or Object Character Recognition (OCR) for retrieving texts.

Additionally or alternatively, the question or challenge may be based on image, image sequence or audio captured by another car 120 that passed the same area earlier, for example between a few seconds and on another day. If another car 120 passed in the area a short time earlier, such as a between a few seconds and a few minutes, then the drivers may participate in a multi-user game by being presented the same questions or challenges and comparing who answers more accurately, faster, or the like. For such social game, the mobile devices of the two cars may communicate with each other. Alternatively, each device may communicate with a server executing a multi-user application.

Figure 2:
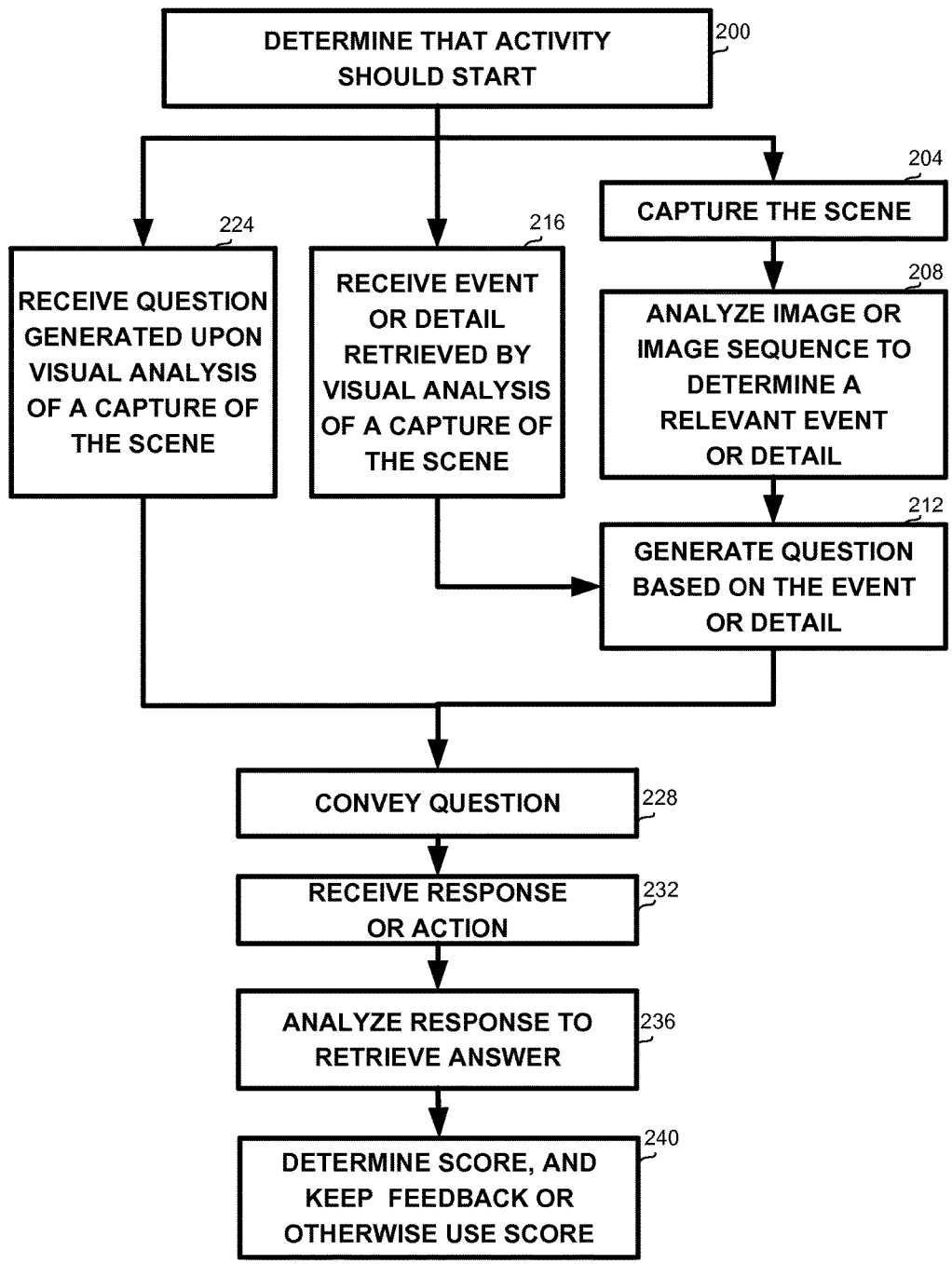
FIG. 2 shows a flowchart diagram of a method for generating a visual scene based car multimedia entertainment program, in accordance with some exemplary embodiments of the disclosed subject matter.

Referring now to FIG. 2, showing a flowchart of steps in a method for engaging a driver in a dialog, wherein the dialog may assist in keeping the driver awake and alert.

On step 200 it may be determined that an activity should start executing on a mobile device associated with a driver. The determination may be based on the driver activating application, on the environment being determined, for example using a GPS, and known to be boring, on the time, for example late noon or late night hours, or the like. In some embodiments, the activity may be started in response to a command received from a device other than the user's mobile device.

On step 204 a visual scene may be captured by one or more images captured by a still camera or a video camera. The capture command may be received from the executed application. Alternatively, the camera may be constantly or intermittently capturing the environment and the signal may be used only when required by the application.

On step 208 the one or more captured images, such as a sequence of images, may be analyzed to search for one or more relevant events or details. The events or details may be retrieved from a road sign, from a nearby vehicle or another object such as a car, a human, an animal, or any other captured object. Analysis may include analysis of an image sequence and/or image analysis, which may include OCR.

On step 212 a question or challenge may be generated based on the retrieved event or detail. For example, the question may relate to the contents of a road sign, the color or another characteristic of a captured vehicle, a garment or a characteristic of a captured human, or the like. It will be appreciated that in some embodiments, the difficulty of the question or challenge may relate or be based on the driver current score, feedback related to the driver's alertness, score level of other drivers, the location as determined using a GPS, the road type or condition, traffic load, or the like.

Alternatively or additionally to steps 204, 208 and 212, on step 216 a detail retrieved by visual analysis of a capture of the scene may be received from an external source. The detail may be a speed limit, a characteristics of a human, vehicle or animal in the area, or the like. The detail may be retrieved from an image captured by a capture device installed on or in another vehicle in the environment, an image captured at an earlier time in the environment, a geographic information system, or any other source. The question may then be generated on step 212 as detailed above.

Alternatively or additionally, on step 224 a question generated upon visual analysis of a capture of the scene may be received from an external source, such as a device associated with another user, a server, or the like.

It will be appreciated that one or more questions may also be received which are not related to the scene as captured by a capture device. Such questions may be general, such as any trivia questions, questions based on information received from a GIS, questions related to the driver or the car, or the like.

On step 228 the question may be conveyed to the driver. If the question is received as an audio signal it may be simply played. However, if the question is generated as text, it may be played after being processed by a text to speech (TTS) engine, or by adjoining prerecorded audio segments. In some embodiments, the question or challenge may also be displayed as text or as an image on a semi-transparent screen on the windshield, or in any other manner.

On step 232, a response or action may be received from the driver. The input may be received as audio so as not to make the driver divert his attention from the road. Alternatively or additionally, the response may be received by capturing a gesture of the driver, for example a hand or head gesture, switching a radio station, or the like.

On step 236 the received response may be analyzed for retrieving the driver's answer or action, for example by performing speech to text and retrieving numbers or any other one or more words if the response is received as an audio stream, analyzing a sequence of images if the response is received as a gesture, checking the driver's action for example switching a radio station in response to the challenge, or the like. The retrieved answer may then be checked or compared against a known response or a response by another user.

On step 240 the response may be compared against a known response or a response by another user, and a driver score may be determined, assigned or updated. The score may be stored on a storage device on the user's device or on a remote storage device, presented as feedback to the user, or otherwise used, for example for giving the user discount on insurance premium, as points in a social network, or the like.

Additionally or alternatively, feedback related to the driver's alertness may be provided to the driver. For example, the driver may receive a message such as "It seems that you are not alert enough, you may want to stop for a break".

It will be appreciated that steps 236 and 240 may also be performed as part of a multi-user game in which a computing platform such as a remote server may generate and present the same or different questions to two or more drivers, compare their results and scores, notify them about each other's scores or answers, let them communicate with each other, or the like.

Figure 3:
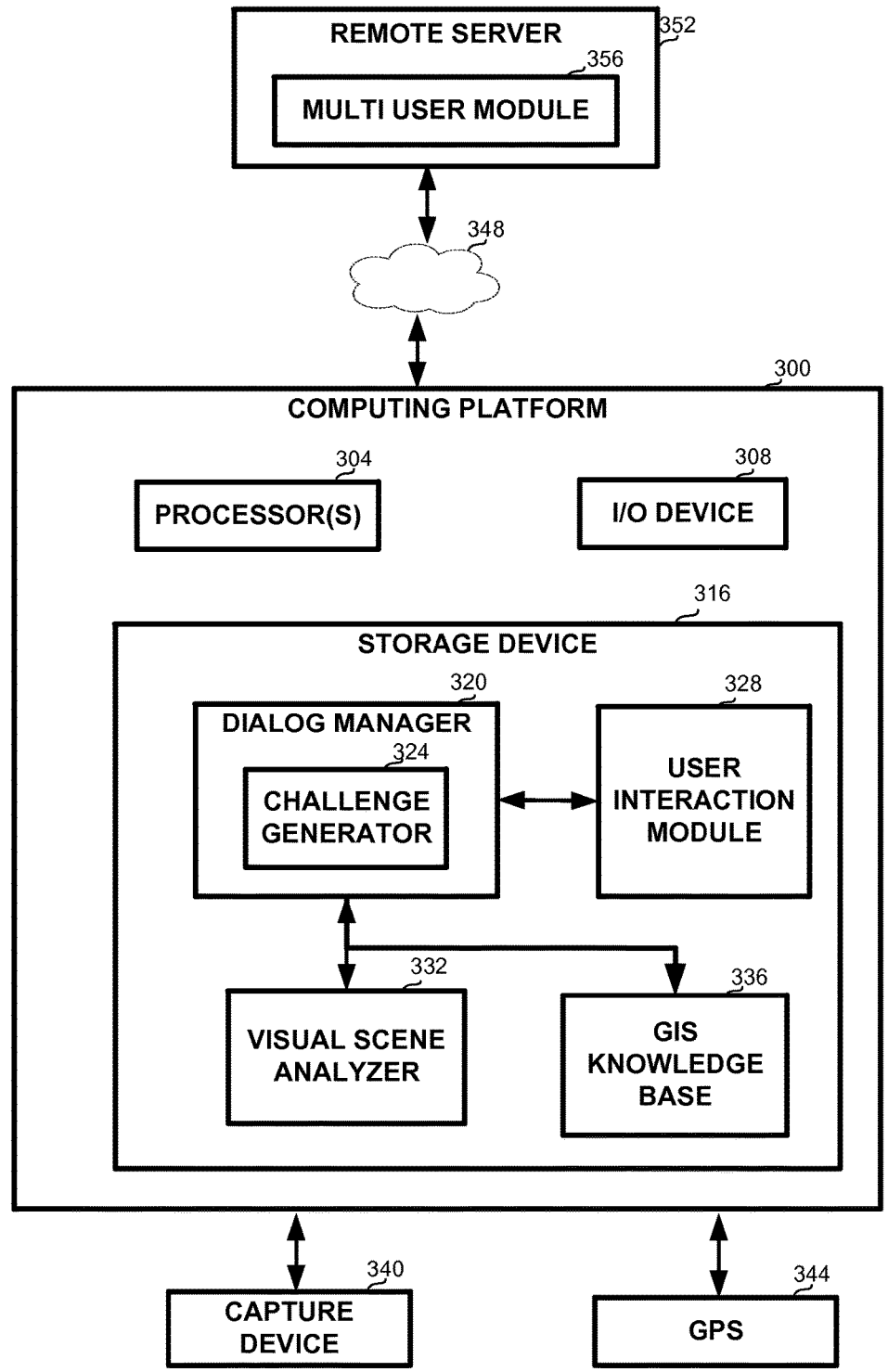
FIG. 3 shows a block diagram of an apparatus for generating a visual scene based car multimedia entertainment program, in accordance with some exemplary embodiments of the disclosed subject matter.

Referring now to FIG. 3, showing an apparatus in accordance with some exemplary embodiments of the disclosed subject matter. The apparatus comprises computing platform 300, such as mobile device 108 of FIG. 1, and may be configured to provide an entertainment program for a driver, in accordance with the disclosed subject matter.

In some exemplary embodiments, computing platform 300 may comprise a processor 304. Processor 304 may be a Central Processing Unit (CPU), a microprocessor, an electronic circuit, an Integrated Circuit (IC) or the like. Processor 304 may be utilized to perform computations required by computing platform 300 or any of it subcomponents.

In some exemplary embodiments of the disclosed subject matter, computing platform 300 may comprise an Input/Output (I/O) device 308. I/O device 308 may be utilized to provide output to and receive input from a user, and in particular audio input and output devices, for example a speaker and a microphone.

In some exemplary embodiments, computing platform 300 may comprise a storage device 316. Storage device 316 may be a hard disk drive, a Flash disk, a Random Access Memory (RAM), a memory chip, or the like. In some exemplary embodiments, storage device 316 may retain program code operative to cause processor 304 to perform acts associated with any of the subcomponents of computing platform 300. Storage device 316 may also store questions or challenges presented to the driver, known answers to the questions or the driver's answers, driver's score, or the like.

Storage device 316 may comprise one or more components as detailed below, implemented as executables, libraries, static libraries, functions, or any other executable components. However, any one or more of the components may be executed by a remote server 352, which may be in communication with computing platform 300 via any communication channel 348 such as the Internet.

Storage device 316 or remote server 352 may comprise dialog manager 320 which may comprise or be in communication with challenge generator 324. Challenge generator 324 may compose a question based on any retrieved or received data item.

Challenge generator 324 or dialog manager 320 may receive input from a variety of sources, such as visual scene analyzer 332 which may receive one or more images from capture device 340, or Geographic Information System (GIS) knowledge base 336 which may receive data from a GPS 344. It will be appreciated that challenge generator 324 or dialog manager 320 may also receive information from any other source such as predetermined information, information from another computing device or another capture device, or the like. In some embodiments, the question may be only loosely coupled to the area of the driver, such as "how many traffic lights are there in New Mexico?". Challenge generator 324 or dialog manager 320 may also receive a question or challenge from another source.

User interaction module 328 may be operative in analyzing user responses or actions. For example, user interaction module 328 may comprise a text to speech engine for converting texts into an audio signal, and speech to text engine for retrieving words such as numbers, names, or the like from the driver's vocal response. Alternatively or additionally, user interaction module 328 may comprise a gesture recognition engine, or the like.

Dialog manager 320 may then receive the question, and using the text to speech engine of voice module 328 may play the question to the driver, receive a response from the driver, such as a vocal response, analyze the response using speech to text engine of voice module 328 and optionally text analysis engines, compare the response to a predetermined response and optionally update the driver's score. The driver's score may be stored locally or on a remote server. In some embodiments, the score may be stored locally and be transmitted to a server when possible.

Challenge generator 324 and dialog manager 320 may receive input such as an image, data or a question from a remote server such as remote server 352, communicating with computing platform 300 via communication channel such as the Internet.

The disclosed method and apparatus may provide an entertainment system for keeping a driver alert without deviating his attention or making him look in another direction but the road. The entertainment system presents to the driver challenges or questions based on visual analysis of the scene, whether the visual analysis is performed over images captured from the vehicle or from another vehicle or another source capturing the scene in real-time or before the information is required.

The questions or challenges may refer to road signs, road conditions, characteristics of permanent or mobile objects in the vicinity of the vehicle, geographic data related to the scene, or the like.

In some embodiments, dialog manager 320 may generate a sentence, a paragraph, music or another audio signal rather than a question, to be read or played to the driver, wherein the sentence, paragraph or another audio may relate to the vicinity of the vehicle and may be based on data retrieved from a visual capturing device. In some embodiments the, question or challenge may be displayed to the user on a semi-transparent screen on the windshield.

In some embodiments, challenge generator 324 may generate a question based on data retrieved from an image only if the data is retrieved with at least a predetermined certainty degree.

In some embodiments, a computing platform external to the vehicle such as remote server 352 may comprise a multi user module 356 which may be responsible for communicating with a multiplicity of users and conducting multi-driver cooperations or competitions, for example between drivers in the same area, drivers driving in a certain time slot, drivers driving in areas with similar road conditions, or the like. In some embodiments, groups of drivers may be competing against each other by combining the scores of several drivers.

In some embodiments, challenge generator 324 may generate challenges of varying complexity levels in accordance with the driver alertness status as may be determined by previous answers of the driver, speech, video, driving parameters, driving style analysis, prompted dialog with the driver, external systems that assess the driver alertness, or the like.

The driver scores may be used for a variety of purposes, such as but not limited to security or driver safety, driver coaching, insurance premium calculation, claim management, rental car rates, or the like. The scores may thus be used by insurance companies, car fleet enterprises, governmental institutes, social networks, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
capturing by an image capture device installed on a first vehicle at least one image of a scene in which a first driver is driving the first vehicle;
analyzing the at least one image, to retrieve an event or detail of the scene;
generating a question or a challenge based on the event or detail, wherein said analyzing and said generating are performed at least partially by a processor external to the first vehicle and to a second vehicle;
transmitting the question or the challenge to the second vehicle, to be responded by a second driver driving the second vehicle in the scene at least one hour after the image is captured;
receiving a response from the second driver;
analyzing the response;
determining a score related to the second driver;
determining an alertness level of the second driver; and
providing explicit feedback to the second driver regarding the alertness level of the second driver,
thereby engaging the second driver in activity based on the question or the challenge,
wherein the question or the challenge is related to a reason for a speed limit being applied in the scene, and
wherein the first driver and one or more passengers of the first vehicle are not participating in the activity together with the second driver.

2. The method of claim 1, wherein the question or the challenge is transmitted to the second driver by playing an audio file.

3. The method of claim 1, wherein the question or the challenge is transmitted to the second driver by displaying an image.

4. The method of claim 1, wherein the response is received from the second driver by capturing audio or by capturing a gesture.

5. The method of claim 1, wherein the response is compared against a predetermined response to obtain the score.

6. The method of claim 1, wherein the response is compared against a response by a driver other than the second driver to obtain the score.

7. The method of claim 1, wherein the score is combined with a score of a driver other than the second driver.

8. The method of claim 1, further comprising using the score in a social network or by an insurer.

9. The method of claim 1, wherein a difficulty level of the question or the challenge varies according to at least one factor selected from the group consisting of: second driver alert level, score level of at least one driver other than the second driver, a location of the second driver, road type road condition, and traffic load.

10. The method of claim 1, wherein the alertness level of the second driver is determined in accordance with at least one item selected from the group consisting of: previous answers of the second driver, speech, video, driving parameters, driving style analysis, prompted dialog with the second driver and external systems that assess the second driver's alertness.

11. The method of claim 1, wherein an answer to the question or the challenge is an existence of road work in a road segment where the speed limit is applied.

12. A computerized apparatus comprising:

a processor, the processor being configured to perform the steps of:
receiving at least one image of a scene in which a first driver is driving a first vehicle, the image captured by an image capture device installed on the first vehicle;
analyzing the at least one image to retrieve an event or detail of the scene;
generating a question or a challenge based on the event or detail, wherein said analyzing and said generating are performed at least partially by a processor external to the first vehicle and to a second vehicle;
transmitting the question or the challenge to the second vehicle, to be responded by a second driver driving the second vehicle in the scene at least one hour after the image is captured; receiving a response from the second driver;
analyzing the second response;
determining a score related to the second driver;
determining an alertness level of the second driver; and
providing explicit feedback to the driver regarding the alertness level of the second driver,
thereby engaging the second driver in activity based on the question or the challenge,
wherein the question or the challenge is related to a reason for a speed limit being applied in the scene, and
wherein the first driver and one or more passengers of the first vehicle are not participating in the activity together with the second driver.

13. The computerized apparatus of claim 12, wherein the question or the challenge is conveyed to the second driver by playing an audio file or by displaying text.

14. The computerized apparatus of claim 12, wherein the response is received from the second driver by capturing audio or by capturing a gesture.

15. The computerized apparatus of claim 12, wherein the score is combined with a score of a driver other than the second driver.

16. The computerized apparatus of claim 12, wherein the alertness level of the second driver is determined in accordance with at least one item selected from the group consisting of: previous answers of the second driver, speech, video, driving parameters, driving style analysis, prompted dialog with the second driver and external systems that assess the second driver's alertness.

17. A computer program product comprising a computer readable storage medium retaining program instructions, which program instructions when executed by a processor, cause the processor to perform the steps of:
receiving at least one image of a scene in which a first driver is driving a first vehicle, the image captured by an image capture device installed on the first vehicle;
analyzing the at least one image to retrieve an event or detail of the scene;
generating a question or a challenge based on the event or detail, wherein said analyzing and said generating are performed at least partially by a processor external to the first vehicle and to a second vehicle;
transmitting the question or challenge to the second vehicle, to be responded by a second driver driving the second vehicle in the scene at least one hour after the image is captured;
receiving a response from the second driver;
analyzing the response;
determining a score related to the second driver;
determining an alertness level of the second driver; and
providing explicit feedback to the second driver regarding the alertness level of the second driver,
thereby engaging the second driver in activity based on the question or the challenge,
wherein the question or the challenge is related to a reason for a speed limit being applied in the scene, and
wherein the first driver and one or more passengers of the first vehicle are not participating in the activity together with the second driver.

\* \* \* \* \*